US007104278B2

(12) United States Patent
Hutchinson et al.

(10) Patent No.: US 7,104,278 B2
(45) Date of Patent: Sep. 12, 2006

(54) LEAK CONTAINER FOR FUEL DISPENSER

(75) Inventors: Ray J. Hutchinson, Houma, LA (US); John S. McSpadden, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 10/829,659

(22) Filed: Apr. 22, 2004

(65) Prior Publication Data

US 2005/0236044 A1 Oct. 27, 2005

(51) Int. Cl.
*B65B 1/04* (2006.01)
*F16K 37/00* (2006.01)

(52) U.S. Cl. .................. 137/558; 137/312; 73/40.5 R; 73/49.2; 141/88; 220/571; 222/108

(58) Field of Classification Search ............... 137/312, 137/558, 68.13; 73/40, 40.5 R, 49.2; 141/86, 141/88; 220/567.2, 571; 222/108
See application file for complete search history.

(56) References Cited

U.S. PATENT DOCUMENTS

| | | | | |
|---|---|---|---|---|
| 1,431,768 A | | 10/1922 | Wyckoff et al. | |
| 3,133,667 A | | 5/1964 | Garrett | 220/88 |
| 4,457,349 A | | 7/1984 | Vazin | 141/86 |
| 4,762,440 A | | 8/1988 | Argandona | 405/52 |
| 4,842,163 A | | 6/1989 | Bravo | 222/40 |
| 4,842,443 A | | 6/1989 | Argandona | 405/52 |
| 4,989,634 A | | 2/1991 | Rieseck | 137/363 |
| 4,997,012 A | * | 3/1991 | Kuziw | 141/1 |
| 5,027,849 A | | 7/1991 | Diesener | 137/236.1 |
| 5,058,774 A | | 10/1991 | Hartman et al. | 222/140 |
| 5,163,467 A | | 11/1992 | Coe | 137/312 |
| 5,167,470 A | * | 12/1992 | Bertolozzi et al. | 137/312 |
| 5,244,307 A | | 9/1993 | Wokas | 405/53 |
| 5,246,044 A | * | 9/1993 | Robertson et al. | 141/86 |
| 5,257,652 A | | 11/1993 | Lawrence | 141/86 |
| 5,285,829 A | | 2/1994 | Bravo | 141/88 |
| 5,301,722 A | * | 4/1994 | Todd et al. | 141/86 |
| 5,341,857 A | | 8/1994 | Bravo | 141/88 |
| 5,400,924 A | | 3/1995 | Brodie | 222/108 |
| 5,429,274 A | | 7/1995 | Vlaskamp | 222/108 |
| 5,514,920 A | | 5/1996 | Key | 307/118 |
| 5,529,098 A | | 6/1996 | Bravo | 141/88 |
| 5,550,532 A | * | 8/1996 | Marshall | 137/312 |
| H1676 H | | 9/1997 | Marshall | 340/605 |
| 5,676,183 A | | 10/1997 | Bravo | 141/88 |

(Continued)

FOREIGN PATENT DOCUMENTS

| | | |
|---|---|---|
| DE | G8632565.5 | 4/1987 |

(Continued)

*Primary Examiner*—Kevin Lee
(74) *Attorney, Agent, or Firm*—Withrow & Terranova, PLLC

(57) ABSTRACT

A leak collection chamber is provided inside the housing of a fuel dispenser. The leak collection chamber collects any leaked fuel from fuel handling components inside the fuel dispenser so that the fuel does not leak to the environment. The leak collection chamber can be removed from the fuel dispenser for evacuation. The control system inside the fuel dispenser can determine the liquid level inside the leak containment chamber and generate signals and alarms if the liquid level exceeds a threshold liquid level value and/or the rate of increase in liquid level exceeds a threshold liquid level increase value. The control system can alert service personnel and/or other systems of the leak collection chamber liquid level. Further, the control system and/or other systems shut down the submersible turbine pump that services the fuel dispenser with fuel in response to catastrophic leak condition.

44 Claims, 7 Drawing Sheets

U.S. PATENT DOCUMENTS

| | | | | |
|---|---|---|---|---|
| 5,687,871 | A | 11/1997 | Pettesch | 220/565 |
| 5,717,564 | A | 2/1998 | Lindale | 361/600 |
| 5,819,975 | A | 10/1998 | Pendleton et al. | 220/484 |
| 5,851,108 | A | 12/1998 | Clymer et al. | 417/44.1 |
| 6,273,021 | B1 | 8/2001 | Pembroke | 116/228 |
| 6,283,173 | B1 | 9/2001 | Osborne | 141/83 |
| 6,311,547 | B1 * | 11/2001 | Nitecki | 73/40 |
| 6,340,269 | B1 * | 1/2002 | Stanton et al. | 137/312 |
| 6,575,206 | B1 * | 6/2003 | Struthers et al. | 141/94 |
| 6,659,143 | B1 | 12/2003 | Taylor et al. | 141/59 |
| 6,834,534 | B1 | 12/2004 | Halla et al. | 73/49.2 |
| 2003/0230592 | A1 | 12/2003 | Hutchinson | 222/1 |
| 2004/0045343 | A1 | 3/2004 | Hutchinson | 73/40.5 R |
| 2004/0149017 | A1 | 8/2004 | Hutchinson | 73/40.5 R |
| 2004/0261503 | A1 | 12/2004 | Hutchinson et al. | 73/49.2 |
| 2004/0261504 | A1 | 12/2004 | Hutchinson et al. | 73/49.2 |
| 2005/0039518 | A1 | 2/2005 | Hutchinson et al. | 73/40.5 R |

FOREIGN PATENT DOCUMENTS

| | | | |
|---|---|---|---|
| DE | 3821408 | C1 | 3/1990 |
| DE | 4420795 | A1 | 12/1994 |

* cited by examiner

LEAK CONTAINER FOR FUEL DISPENSER

FIELD OF THE INVENTION

The present invention relates to providing a fluid containment chamber within a fuel dispenser to collect leaked fluid, including fuel, and/or for a fuel dispenser that does not require a fuel dispenser sump.

BACKGROUND OF THE INVENTION

As illustrated in FIG. 1, fuel dispensers 10 are installed in service stations on islands 14. The islands 14 are footprints that are designed to receive a fuel dispenser housing 12. The islands 14 are typically constructed out of cement slabs and have pre-run fuel piping conduits that are run underneath the ground to submersible turbine pumps (not shown) that are coupled to underground storage tanks (not shown) containing fuel. The fuel is pumped from the underground storage tanks to the fuel dispensers 10 via the fuel piping conduit.

As shown in FIG. 1, the fuel piping conduit consists of a main fuel piping conduit 16 that carries fuel underneath each of the fuel dispensers 10. A separate main fuel piping conduit 16 is provided for each grade of fuel stored in underground storage tanks. The main fuel piping conduit 16 is typically double-walled piping to meet regulatory requirements for secondary containment of any leaks that may occur. The main fuel piping conduit 16 contains an inner piping 17 inside that carries the fuel. An interstitial space is formed between the space of the inner piping 17 and the outer piping 18 to provide secondary containment of any leaks that occur in the inner piping 17.

Fuel is directed to individual fuel dispensers 10 by a branch piping conduit 19 that is fluidly coupled to the main fuel piping conduit 16. The branch piping conduit 19 is typically connected to the main fuel piping conduit 16 in a perpendicular fashion, and a fitting 20 is provided at the junction point where the branch piping conduit 19 connects to the main fuel piping conduit 16. The branch fuel piping conduit 19 is then connected to a shear valve 22 located in the island. During installation, field service personnel connects the outlet 24 of the shear valve 22 to the internal fuel piping conduit 26 in the fuel dispenser 10 so that the fuel dispenser 10 has access to fuel pumped from the underground storage tank.

The internal fuel piping conduit 26 is further fitted to fuel dispenser components, such as valves and meters for example, where such fittings introduce the potential for leaks. If a leak occurs in the conduit 26 or at fittings or other fuel dispensing components, regulations require that these leaks are contained. This secondary containment is provided today in the form of a fuel dispenser sump 28 underneath each fuel dispenser 10. The main fuel piping conduit 16 is run into the fuel dispenser sump 28 through fitted connections 30 provided on the fuel dispenser sump 28. Typically, the main fuel piping conduit 16 enters the fuel dispenser sump at connection 29 and the outer piping 16 is terminated thereby leaving on the inner piping 17 inside the fuel dispenser sump 28. Once the inner piping 17 leaves the fuel dispenser sump 28 on the other side, a connection 29 is made to provide double-walled piping 16 until the main fuel piping conduit 16 reaches the next fuel dispenser sump 28.

The branch fuel piping conduit 19 is connected to the main fuel piping conduit 16 via the fitting 20, as previously described. If a leak occurs at the fitting 20 or in the branch fuel piping conduit 19, the leak will be contained in the fuel dispenser sump 28. There are also other points for potential leaks for which the fuel dispenser sump 28 provides secondary containment. One such point is at the fitting 20 that connects the main fuel piping conduit 16 and the branch fuel piping conduit 19, where a potential for a leak exists at the point of the fitting 20. The fitting 20 is not provided with an outer wall or secondary containment that will capture any leaks like that of the main conduit fuel piping 16. The branch fuel piping conduit 19 is also not double-walled piping. Because of the leak potential at the fitting 20 between the main fuel piping conduit 16 and the branch fuel piping conduit 19, and because the branch fuel piping conduit 19 is not double-walled piping, secondary containment contains any leaks that may occur at the fitting 20 and/or in the branch fuel piping conduit 19.

One problem that results from use of a fuel dispenser sump 28 is that the sump will also collect rainwater or other debris that runs into the fuel dispenser 10 from the outside ground. This causes the fuel dispenser sump 28 to fill up even if a leak has not occurred. The fuel dispenser sump 28 is provided with a liquid detection sensor 32 so that service personnel can be alerted when the fuel dispenser sump 28 contains liquid. When significant liquid is detected in the fuel dispenser sump 28 and/or upon the detection of a significant leak and collection of such leak in the fuel dispenser sump 28, the fuel dispenser sump 28 must be emptied by service personnel since it is not known whether the liquid is fuel. Fuel cannot be allowed to overflow the fuel dispenser sump 28. Each time the fuel dispenser sump 28 contains a significant amount of liquid, whether it be leaked fuel, rainwater or other debris, a service visit must be made to empty the fuel dispenser sump 28 thereby causing significant and ongoing servicing expense. The service visit is further complicated by the fact that the fuel dispenser sump 28 is located beneath ground underneath the fuel dispenser 10 and not easily accessed by service personnel for evacuation.

Therefore, there exists a need to provide a fuel dispenser that does not require a fuel dispenser sump below ground to provide secondary containment for leaks. In this manner, the fuel dispenser will easier to service and less costly.

SUMMARY OF THE INVENTION

The present invention relates to a leak collection chamber inside a fuel dispenser housing. In one embodiment, the leak collection chamber is placed inside a fuel handling components area of the fuel dispenser. The leak collection chamber collects any leaked fuel from inside the fuel dispenser to prevent such fuel from reaching the environment. The fuel dispenser may be additionally equipped with a slanted collection plate to direct leaked fuel into the leak collection chamber if the leak collection chamber does not include the same internal size as the housing of the fuel dispenser.

In one embodiment, a scale is provide underneath the leak collection chamber to measure the weight of the chamber. The weight of the chamber is communicated electronically to a control system inside the fuel dispenser. Using the weight measurement, the control system can determine the fluid level inside the leak collection chamber using a conversion factor between weight and fluid level. In this manner, the control system has knowledge of when the liquid level inside the leak collection chamber has exceeded a threshold level so that the control system can alert service personnel, via signals and alarms, to empty the leak collection chamber before it overflows. In another embodiment, a liquid level sensor placed inside the leak collection chamber is communicated to the control system to indicate the fluid level inside the leak collection chamber.

The control system may also measure the liquid level in the leak collection chamber at various points in time to determine the speed or rate at which fluid is being collected in the leak collection chamber. If the increase in collection of leaks exceeds a threshold increase rate, this may be indicative of a catastrophic leak inside the fuel dispenser. In response, the control system itself, or by communication with other systems, such as a tank monitor or site controller for example, may generate signals, alarms, and/or cause the submersible turbine pump that pumps fuel to the fuel dispenser to shut down until the leak is corrected.

The fuel dispenser may be equipped with a door on the outside of its housing to access the leak collection chamber for removal and evacuation. The door may contain a lock so that unauthorized persons cannot gain access to the leak collection chamber for safety reasons.

The leak collection chamber may also contain a chain or other physical connection to the shear valves inside the fuel dispenser. The shear valves are designed to cut off fuel flow into the fuel dispenser from piping conduits in the event that an impact is made to the fuel dispenser for safety reasons as is well known in the art. If the leak collection chamber is removed for evacuation, there is no method of collection of leaks in the fuel dispenser during the time of this removal. Therefore, the chain is connected to the shear valve so that the shear valve is shut off mechanically when the force from removal of the leak collection chamber pulls on a lever on the shear valve. When the leak collection chamber is placed back inside the fuel dispenser, the shear valve can be manually reopened by service personnel.

Those skilled in the art will appreciate the scope of the present invention and realize additional aspects thereof after reading the following detailed description of the invention in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a fuel dispenser that eliminates the need for a fuel dispenser sump located underneath the ground. The present invention provides a leak containment chamber inside the fuel dispenser that collects any leaked fuel from the fuel piping inside the fuel dispenser.

Figure 1:
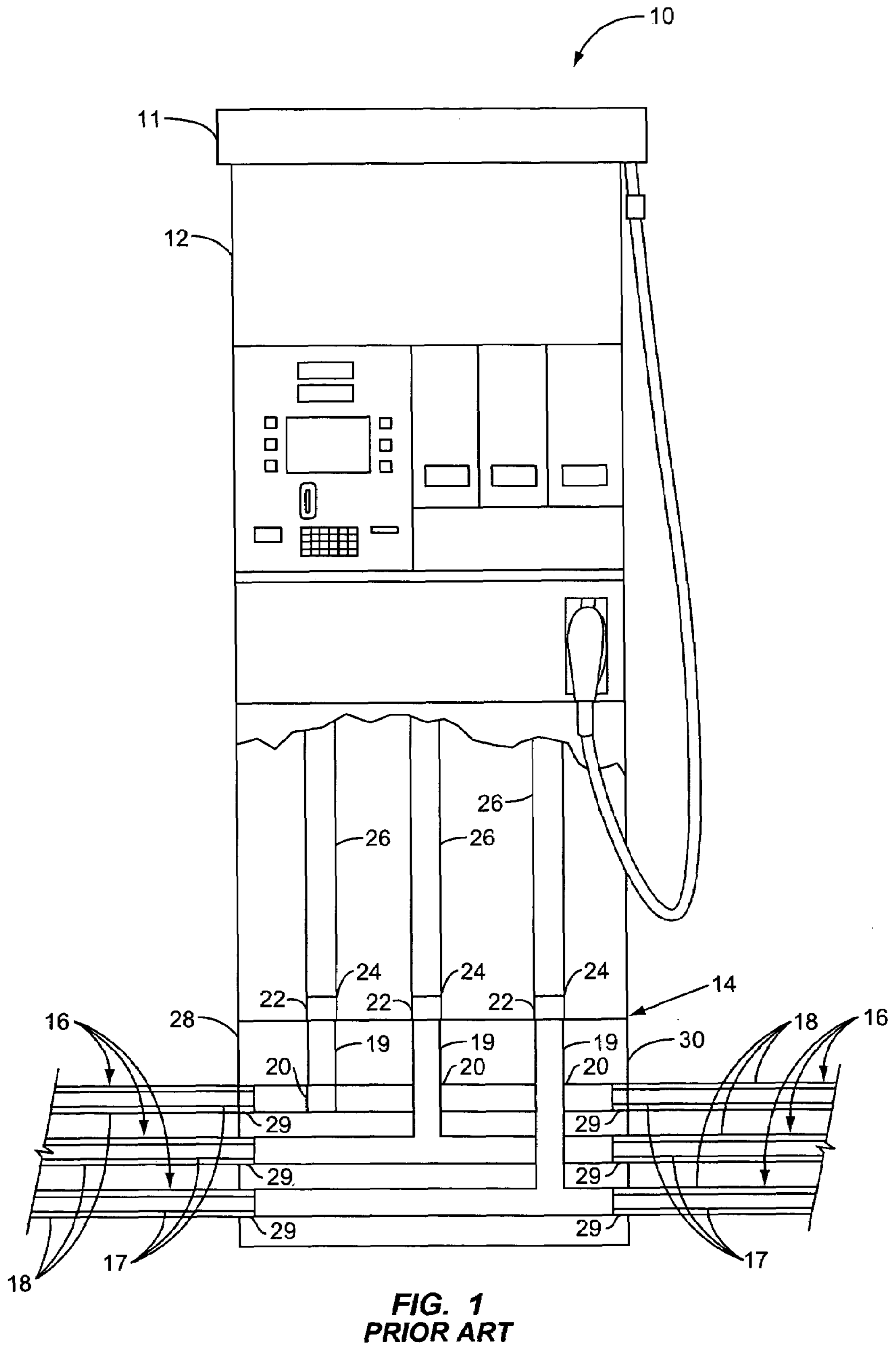
FIG. 1 PRIOR ART
FIG. 1 is an illustration of a fuel dispenser and fuel dispenser sump configuration in the prior art.
Figure 2:
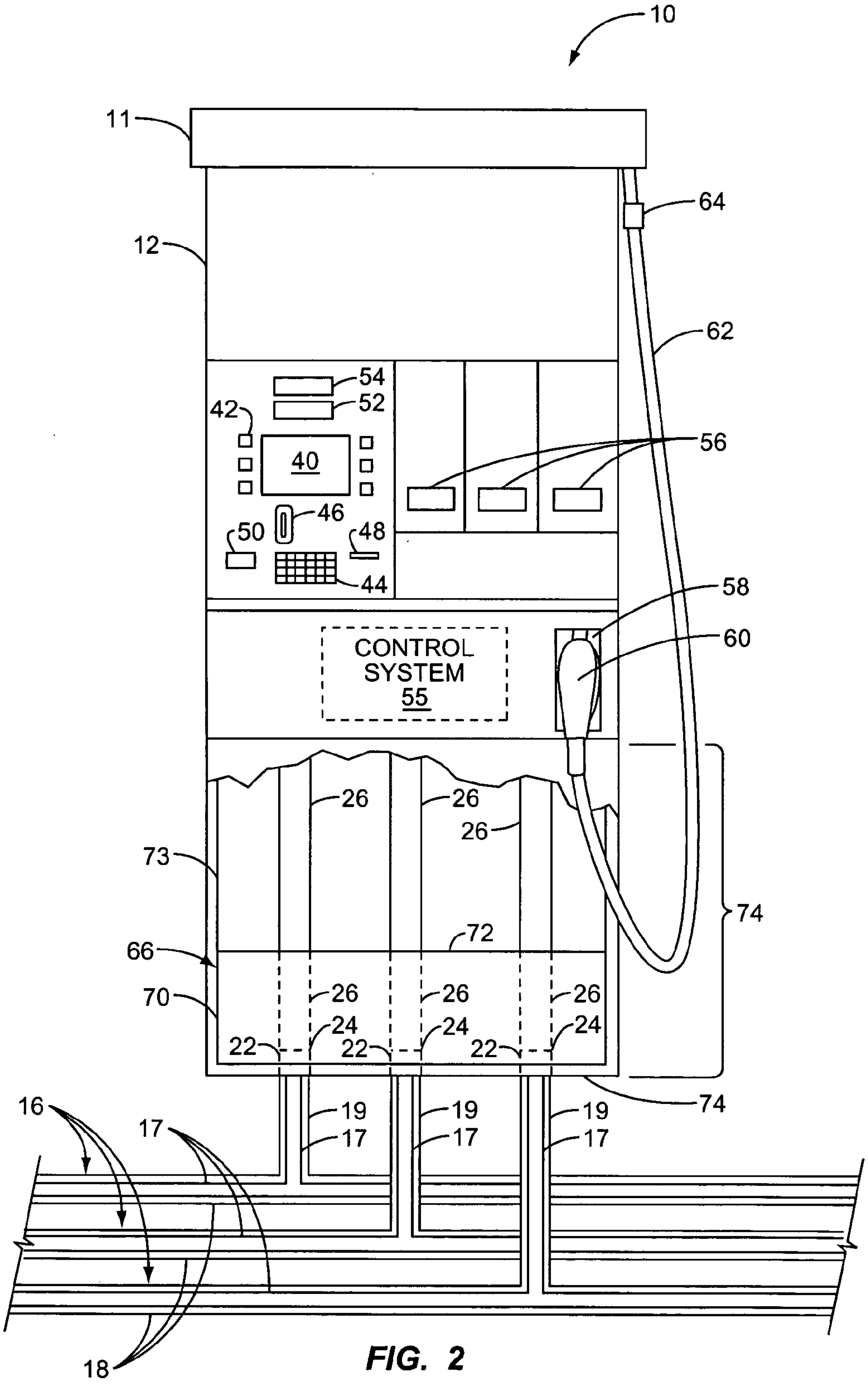
FIG. 2 is a front view of a fuel dispenser containing a leak collection pan in accordance with one embodiment of the present invention.

In FIG. 2, an exemplary fuel dispenser 10 is illustrated with some similar characteristics of the fuel dispenser 10 in FIG. 1. The fuel dispenser 10 is comprised of a housing 12 that houses the components of the fuel dispenser 10. The fuel dispenser 10 may also contain a canopy 11 that is placed on top of the housing 12. The fuel dispenser 10 may contain a visual display 40 for displaying instructions and other information to a customer. The display 40 may contain keys or soft keys 42 located around the display 40 for the customer to provide selections and input for directing the actions of the fuel dispenser 10. The fuel dispenser 10 may also have other various input devices found on many common dispensers, such as a keypad 44, a card reader 46, a receipt printer 48, and a smart card reader 50, as is commonly known in the fuel dispenser art. The fuel dispenser 10 also has a transaction totals display consisting of a volume display 52 showing the amount of fuel dispensed by the customer (typically in gallons), and a price display 54 showing the amount to be charged to the customer for the fuel dispensed. Each of the input devices and displays are controlled by a control system 55 within the fuel dispenser 10.

The fuel dispenser 10 also typically is capable of dispensing more than one type or grade of fuel. The fuel dispenser 10 may include octane selection buttons 56. The customer selects one of the octane selection buttons 56 to choose the desired grade of fuel to dispense at the beginning of a fueling transaction. After the customer initiates the fuel dispenser 10 to dispense fuel, the customer lifts the nozzle 60 from the nozzle handle 58 and inserts the nozzle 60 into the vehicle to be dispensed (not shown). The nozzle 60 is connected to a hose 62 that is in turn connected to the fuel piping conduit 26 inside the fuel dispenser 10 that receives fuel from the main fuel piping conduit 16 from an underground storage tank.

The hose 62 may be fitted with a breakaway 64 that is designed to separate the hose 62 from the fuel dispenser housing 12 in the event that a significant force is applied to the hose for safety reasons, such as if a vehicle drives away with the nozzle 60 still inserted into the vehicle.

The present invention provides a leak containment chamber 66 within the fuel dispenser housing 12 to collect any leaked fuel from internal fuel handling components within the housing 12. The leak containment chamber 66 is in the form of a box shape that has a bottom 68, sides 70, and an open top 72. The leak containment chamber 66 is located at the bottom of the fuel dispenser housing 12 so that any leaked fuel from any fuel dispensing components within the fuel dispenser 10 fall towards the fuel containment chamber 66 via gravity and are collected. A slanted collection plate 73 is provided to receive any leaked fuel or fluid and direct such fuel or fluid into the leak collection chamber 66.

Examples of fuel handling components include valves, meters, piping, and filters, each of which have fittings that are also susceptible to leaks. The fuel containment chamber 66 is located in the Class 1, Division 1 area 74 of the fuel dispenser housing 12 where fuel handling components are located. For more information on class divisions within fuel dispensers 10, see U.S. Pat. No. 5,717,564 incorporated by reference herein in its entirety. For more information about double-walled piping and piping conduit architectures that may be used in the present invention, see U.S. application Ser. Nos. 10/238,822; 10/430,890; 10/703,156; 10/774,749 and 10/775,045, each of which are incorporated herein by reference in their entireties.

Figure 3:
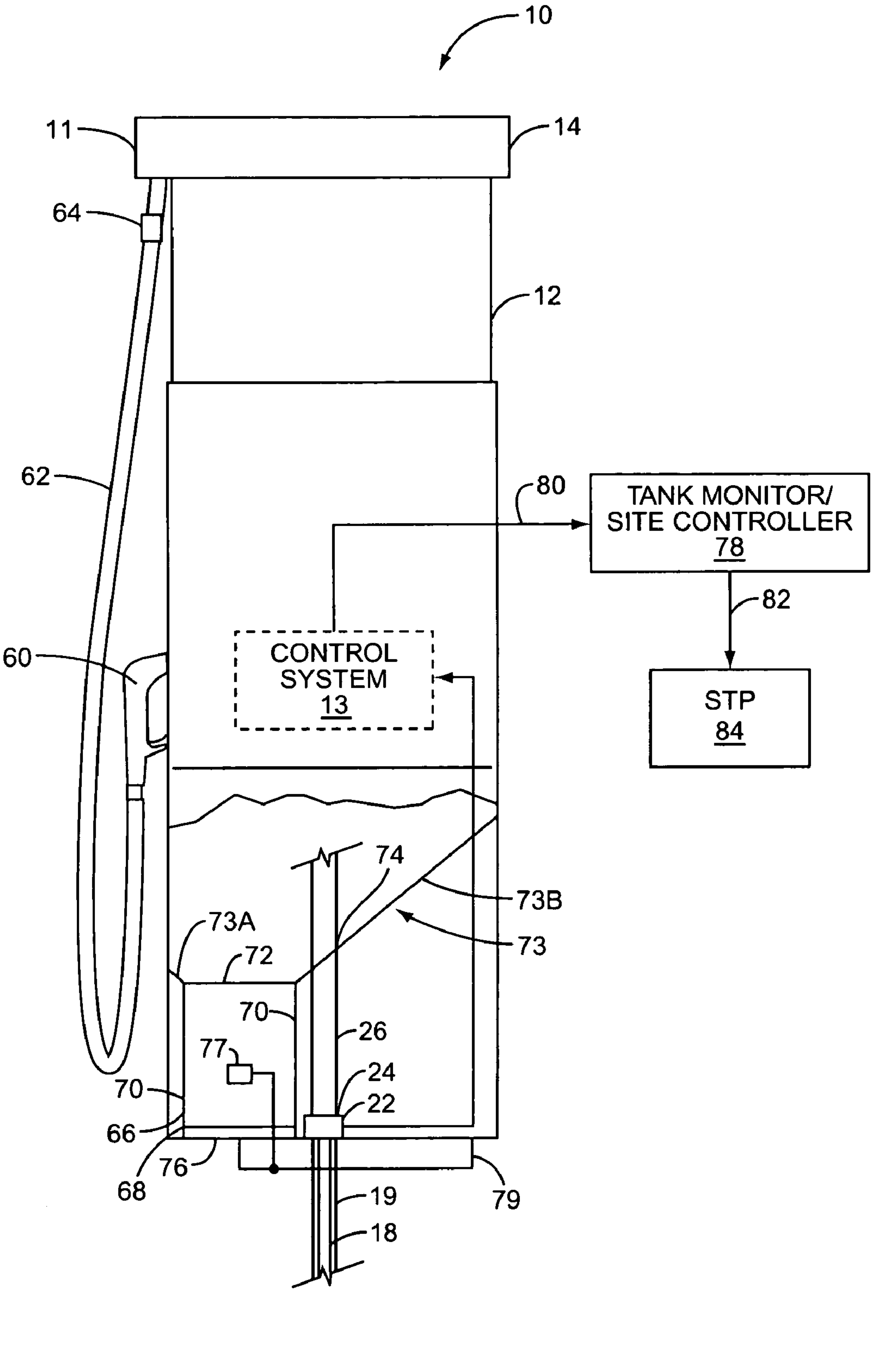
FIG. 3 is a side view of FIG. 1.

FIG. 3 illustrates a side view diagram of the fuel dispenser 10 illustrated in FIG. 2 to better illustrate the leak containment chamber 66 and the slanted collection plate 73. The leak collection chamber 66 is located on one side of the fuel piping conduits 26 in the preferred embodiment so that it can be easily removed for evacuation without interference with the fuel piping conduits 26. Only one fuel piping conduit 26 is shown in this diagram, but the additional fuel piping conduits 26 are hidden behind the first fuel piping conduit 26 located in the front of the side view. The slanted collection plate 73 allows the capture and routing of leaked fuel from components that are not located above the leak collection chamber 66 to be drained to the leak collection chamber 66.

In the preferred embodiment, the slanted collection plate 73 consist of two plates 73A, 73B since the leak collection chamber 66 is not located all the way to either side of the internal walls of the housing 12. The slanted collection plate 73 may be made out of any material that is capable of handling fuel, and is preferably sheet metal or tin. Because the slanted collection plate 73 passes across the same plane as the fuel piping conduits 26, the slanted collection 73 additionally contains an orifice 74 for each fuel piping conduit 26 to pass therethrough. During installation a seal or potting compound is used around the orifice 74 where the fuel piping conduit 26 passes through the slanted collection plate 73 so that leaked fuel does not run through the orifice 74 and to the bottom of the housing 12 outside of the leak collection chamber 66.

A scale 76 is additionally provided in the housing 12 underneath the leak collection chamber 66 so that the weight of the leak collection chamber 66 is measured. A weight signal line 79 is coupled from the scale 76 to the control system 13 so that the control system 13 receives the weight of the leak collection chamber 66. In this manner, the control system 13 can be programmed with threshold weight measurements using empirical testing that indicate the approximate liquid level present in the leak collection chamber 66. The control system 13 can then communicate the weight and/or liquid level of the leak collection chamber 66 to other systems located in the service station environment or even remotely. In FIG. 3, the control system 13 is coupled to a tank monitor and/or site controller 78 (also called "controller") via a communication line 80. The tank monitor and/or site controller 78 can generate an alarm and/or send a signal to alert service personnel when the liquid level inside the leak containment chamber 66 exceeds a threshold indicating that evacuation service is necessary.

In an alternative embodiment, a fluid level sensor 77 may be placed inside the leak containment chamber 66. The fluid level sensor 77 measures the fluid level inside the leak containment chamber 66. The fluid level sensor 77 may be a float or other device that is capable of indicating liquid level. The fluid level sensor 77, if present, is electrically coupled to the control system 13 so that the control system 13 can use such information to have knowledge of the liquid level for operational aspects of the present invention, as discussed below.

Figure 4:
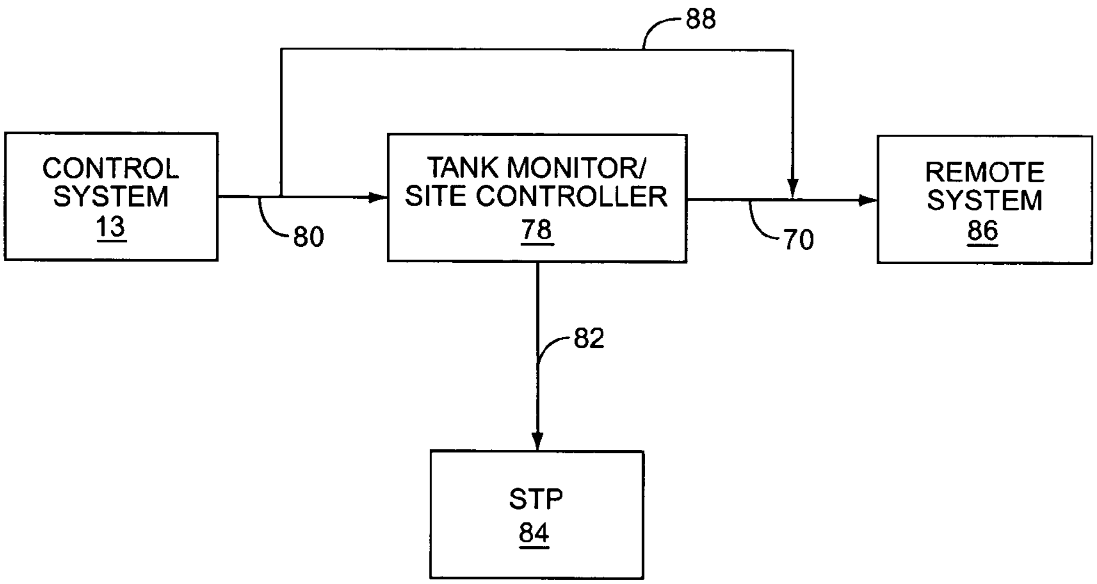
FIG. 4 is a communication architecture of systems coupled to the control system of the fuel dispenser.

The tank monitor and/or site controller 78 can also determine the rate at which the liquid level in a leak containment chamber 66 rises to determine the rate of a leak in the fuel dispenser 10. If the leak rate exceeds a threshold rate, this may be indicative of a catastrophic leak for which immediate attention is necessary. The tank monitor and/or site controller 78 can generate a control signal 82 to a submersible turbine pump (STP) 84 to shut down the STP 84 and stop fuel from being pumped to the fuel dispensers 10 if a leak containment chamber 66 is collecting leaks at a rate sufficient to indicate a catastrophic leak. In FIG. 4, the control system 13 is alternatively coupled to a remote system 86 via a remote communication line 88 so that a signal and/or alarm indicative of the condition of a leak containment chamber 66 can be communicated to a system located off-site from the service station if desired.

Figure 5:
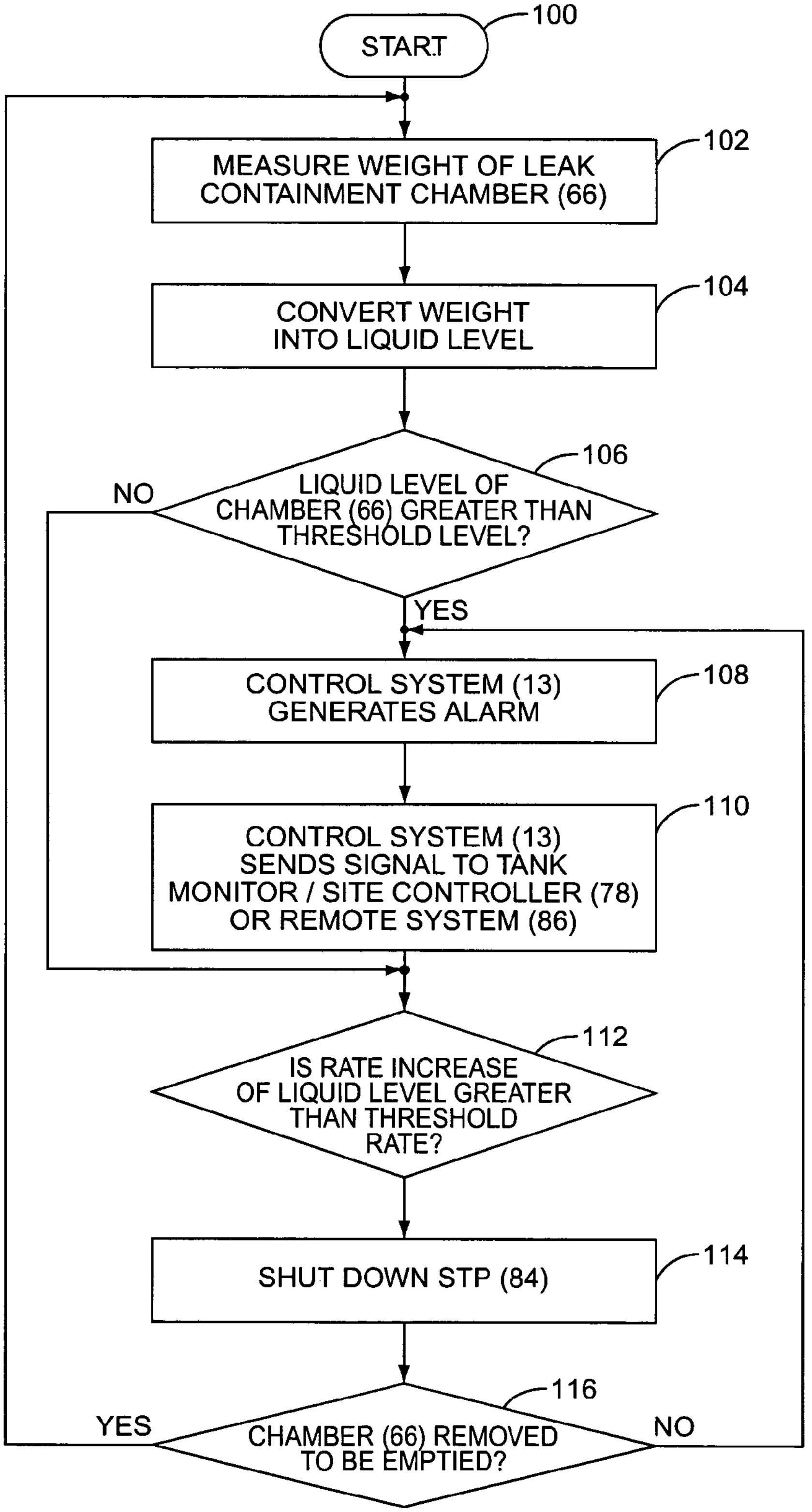
FIG. 5 is a flowchart diagram of operational aspects of the present invention.

FIG. 5 illustrates a flow chart of the operational aspects of the present invention in response to weight measurements made by the scale 76 of the weight of the leak containment chamber 66. It should be noted that this illustration is of one embodiment and the present invention may include some or all of these operational aspects illustrated in FIG. 5.

As illustrated in FIG. 5, the process starts (block 100), and the control system 13 measures the weight of the leak containment chamber 66 using measurements from the scale 76 (block 102). The control system 13 then converts the weight of the leak containment chamber 66 into a liquid level using preprogrammed weight to liquid level conversion values stored in memory of the control system 13 (block 104). Alternatively, if a liquid level sensor 77 is used in the leak containment chamber 66, blocks 102 and 104 could be performed by the liquid level sensor 77 communicating the liquid level to the control system 13 without the need for conversion of weight to liquid level.

Where weight is converted to liquid level, prior to operation of the invention, empirical testing is performed to preprogram weights of the leak containment chamber 66 to liquid levels. Liquid is placed in the leak containment chamber 66 at various known levels and the weight of the chamber 66 is measured. This is repeated for various weights from empty to full, and in between, and programmed into the control system 13. The control system 13 can then take any weight of the leak containment chamber 66 and convert the weight into a liquid level using the preprogrammed weight to level values. For weights that fall in between programmed measurements, the control system 13 can use correlation to determine the liquid level in the leak containment chamber 66.

After the control system 13 converts the weight of the leak containment chamber 66 into a liquid level or receives the liquid level from the liquid level sensor 77, as the case may be, the control system 13 compares the liquid level to a programmed threshold liquid level value to determine if the current liquid level is greater than the threshold liquid level value (decision 106). The programmed liquid level value can be indicative of a full leak containment chamber 66, but it is preferable to program the threshold liquid level value to a value that is less than full so that service personnel have time to empty the leak containment chamber 66 before it can have an opportunity to fully fill and possibly overflow the leak containment chamber 66.

If the liquid level in the leak containment chamber 66 is not greater than the threshold liquid level value, then control system 13 will determine if the liquid level rate is increasing a level greater than a liquid level increase rate value, discussed below for decision 112. If the liquid level in the leak containment chamber 66 is greater than the threshold liquid level value programmed in memory of the control system 13, the control system 13 will generate an alarm to indicate that the leak containment chamber needs to be evacuated (block 108). The control system 13 will next send a signal to the tank monitor and/or site controller 78 or remote system 86, or both, to indicate to service personnel that the leak containment chamber needs to be evacuated (block 110). The control system 13 could also send a signal to the STP 84 to shut down via the tank monitor/site controller 78 (not shown).

The control system 13 will then determine if the increase rate of the liquid level in the leak containment chamber 66 exceeds a threshold increase rate stored in memory of the control system 13 (decision 112). The control system 13 determines the rate of increase in the leak containment chamber 66 by taking the current liquid level detected in the leak containment chamber 66 and determining the slope of the line between the current liquid level detected in the leak containment chamber 66 and the previous liquid level detected in the leak containment chamber 66. If the rate of increase in the liquid level in the leak containment chamber 66 is greater than a threshold rate increase, this is indicative of a catastrophic leak occurring in the fuel dispenser 10 in which the leak containment chamber 66 is located. The control system 13 will either itself, or by communication with the tank monitor and/or site controller 78, direct the STP 84 to shut down (block 114). This is to stop the fuel flow to the fuel dispenser 10 to prevent further leaking from occurring since the fuel dispenser 10 cannot leak fuel other than fuel already located in the internal fuel piping conduit 26 and the main and branch fuel piping conduits 16, 18, if the fuel supply is cutoff from the fuel dispenser 10.

The control system 13 then determines if the leak containment chamber 66 has been removed based on the lack of weight from the scale 76 whether it be from the "NO" path of decision 112 or from block 114 (decision 116). If the leak containment chamber 66 has not been removed, the control system 13 continues to perform the operations by returning to block 108 to repeat the generating of alarms (block 108) and signals (block 110) to alert service personnel to evacuate the leak containment chamber 66. If the leak containment chamber 66 has been removed, then control system 13 returns back to the beginning of the process at block 102 to determine if the leak containment chamber 66 needs to be evacuated and/or the fuel dispenser 10 in which the leak containment chamber 66 is located contains a catastrophic leak (blocks 102–116).

Figure 6:
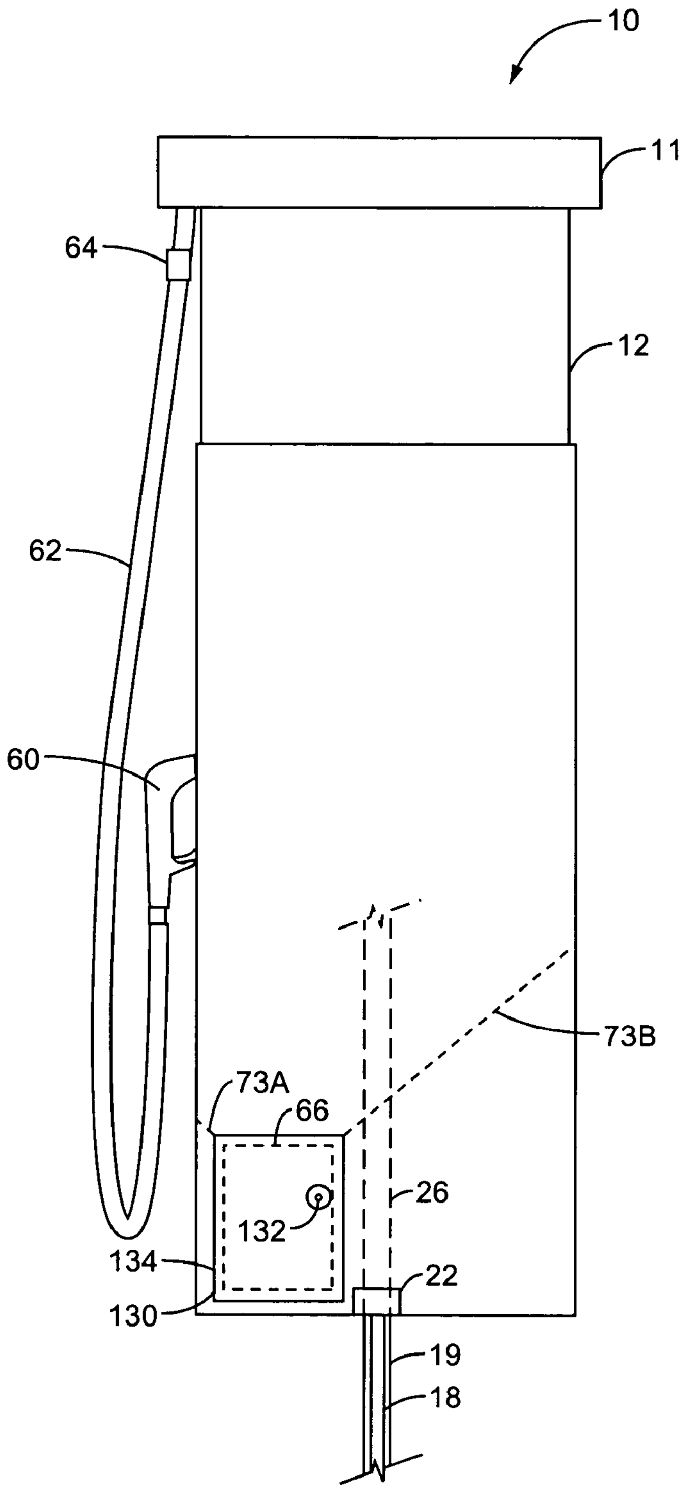
FIG. 6 is an illustration of a locking door on the side of a fuel dispenser that is opened to remove the leak collection pan from the fuel dispenser.

FIG. 6 illustrates the fuel dispenser 10 equipped with an outside door 130 that can be opened to insert the leak containment chamber 66 into the fuel dispenser housing 12 and remove the leak containment chamber 66 from the housing 12 when evacuation is needed. The door 130 contains a lock 132 to prevent unauthorized access to the leak containment chamber 66 for safety purposes. The door contains a hinged side 134 so that the door swings open from right to left.

Figure 7:
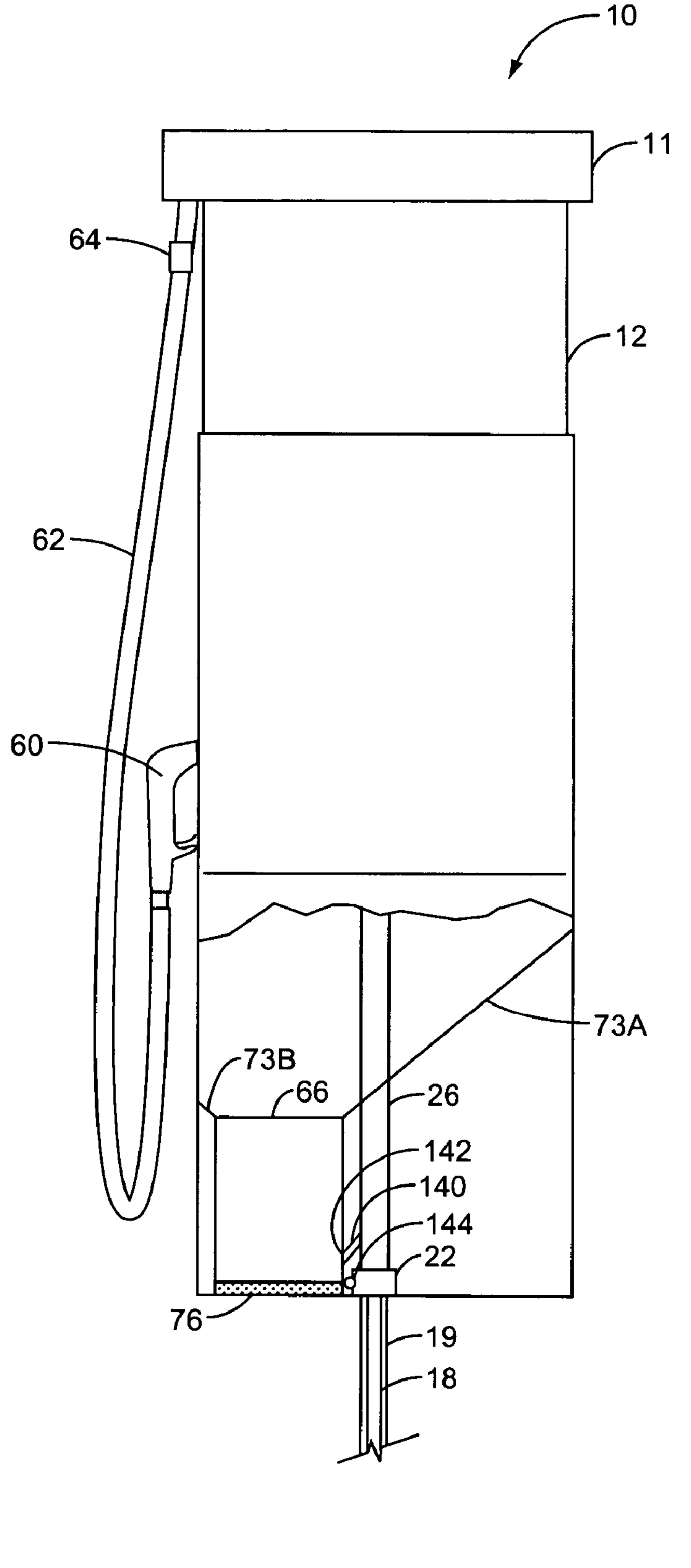
FIG. 7 is an illustration of a shear valve shut off mechanism in accordance with an embodiment of the present invention.

FIG. 7 illustrates another aspect of the present invention related to removal of the leak containment chamber 66 from the housing 12. If the leak containment chamber 66 is removed from the fuel dispenser housing 12, any leaks that occur in the fuel dispenser 10 will not be captured and will leak to the bottom of the fuel dispenser housing 12 and possibly to the outside environment. Therefore, it is desired to cut off the fuel supply from the branch fuel piping conduit 19 to the fuel dispenser fuel supply piping 26 when the leak containment chamber 66 is removed. Therefore, the present invention provides an extra measure of security in the form of a chain 140 that is connected to both the leak containment chamber 66 and a cutoff lever 144 of the shear valve 22. Shear valve 22 has a lever that must be manually engaged for the shear valve 22 to be opened as is well known in the fuel dispenser art. When a sufficient force is applied to the lever 144, the lever 144 is released and the shear valve 22 automatically closes in response. Normally, the lever 144 is designed to close when an impact occurs to the fuel dispenser 10. In the present invention, when the leak containment chamber 66 is removed from the housing, the chain 140 applies a pulling force to the lever 144 and cuts off the shear valve 22 so that the fuel dispenser 10 is cut off from the fuel supply in the event that a leak is present in the fuel dispenser 10 while the leak containment chamber 66 is removed. Otherwise, if the fuel dispenser 10 contained a leak, the leak may continue to generate leaked fuel in the absence of the leak containment chamber 66 since the fuel dispenser 10 would be coupled to the fuel supply.

Those skilled in the art will recognize improvements and modifications to the preferred embodiments of the present invention. All such improvements and modifications are considered within the scope of the concepts disclosed herein and the claims that follow.

What is claimed is:

1. A fuel dispenser that dispenses fuel received from a main fuel piping conduit fluidly coupled to an underground storage tank, comprising:

a housing containing a fuel handling component area;

an internal fuel piping conduit that is fluidly coupled to the main fuel piping conduit to receive fuel;

a leak collection chamber having a bottom and sides with an open top that is located inside said fuel handling component area and that collects fluid leaked inside said housing;

a control system and a scale located underneath said leak collection chamber wherein said scale is coupled to said control system to register the weight of said leak collection chamber; and a slanted collection plate located inside said fuel handling component area that is coupled to a side of said leak collection chamber and to an inside surface of said housing that collects leaked fluid and transports the fluid to said leak collection chamber by gravitational force.

2. The fuel dispenser of claim 1 further comprising an internal fuel piping conduit located inside said fuel handling component area that is fluidly coupled to the main fuel piping conduit wherein said leak collection chamber is located on a first side of said internal fuel piping conduit.

3. The fuel dispenser of claim 1, wherein said internal fuel piping conduit passes through an orifice inside said slanted collection plate.

4. A fuel dispenser that dispenses fuel received from a main fuel piping conduit fluidly coupled to an underground storage tank, comprising:

a housing containing a fuel handling component area;

an internal fuel piping conduit that is fluidly coupled to the main fuel piping conduit to receive fuel;

a leak collection chamber having a bottom and sides with an open top that is located inside said fuel handling component area and that collects fluid leaked inside said housing; and a control system and a scale located underneath said leak collection chamber wherein said scale is coupled to said control system to register the weight of said leak collection chamber;

wherein said control system correlates a fluid level in said leak containment chamber based on the weight of said leak containment chamber.

5. The fuel dispenser of claim 4, wherein said control system sends a signal to a controller when the weight of said leak collection chamber exceeds a threshold weight.

6. The fuel dispenser of claim 5, wherein said control system generates an alarm when the weight of said leak collection chamber exceeds a threshold weight.

7. The fuel dispenser of claim 5, wherein said controller or control system sends a signal to a submersible turbine pump that pumps fuel from the underground storage tank to the main fuel piping conduit to shut down said submersible turbine pump in response to receipt of said signal from said control system.

8. The fuel dispenser of claim 4, wherein said control system sends a signal to a controller when the fluid level of said leak collection chamber exceeds a threshold fluid level.

9. The fuel dispenser of claim 8, wherein said control system generates an alarm when the fluid level of said leak collection chamber exceeds a threshold fluid level.

10. The fuel dispenser of claim 8 wherein said controller or control system sends a signal to a submersible turbine pump that pumps fuel from the underground storage tank to the main fuel piping conduit to shut down said submersible turbine pump in response to receipt of said signal from said control system.

11. The fuel dispenser of claim 4, wherein said control system determines the rate of increase of the fluid level in said leak collection chamber.

12. The fuel dispenser of claim 11, wherein said control system sends a signal to a controller if said rate of increase in the fluid level of said leak collection chamber exceeds a threshold rate of increase.

13. The fuel dispenser of claim 11, wherein said control system generates an alarm if said rate of increase in the fluid level of said leak collection chamber exceeds a threshold rate of increase.

14. The fuel dispenser of claim 12, wherein said controller or control system sends a signal to a submersible turbine pump that pumps fuel from the underground storage tank to the main fuel piping conduit to shut down said submersible turbine pump in response to receipt of said signal from said control system.

15. A fuel dispenser that dispenses fuel received from a main fuel piping conduit fluidly coupled to an underground storage tank, comprising:

a housing containing a fuel handling component area;

a shear valve that contains a shut off latch;

an internal fuel piping conduit that is fluidly coupled to the shear valve and the main fuel piping conduit to receive fuel; and a leak collection chamber having a bottom and sides with an open top that is located inside said fuel handling component area and that collects fluid leaked inside said housing, wherein said leak collection chamber is coupled to said shut-off latch of said shear valve such that said shut-off latch is activated when said leak collection chamber is removed from said housing;

wherein said housing contains an exterior door that allows removal of said leak collection chamber from said housing.

16. The fuel dispenser of claim 15, wherein said exterior door contains a locking mechanism.

17. The fuel dispenser of claim 15 further comprising an internal fuel piping conduit located inside said fuel handling component area that is fluidly coupled to the main fuel piping conduit wherein said leak collection chamber is located on a first side of said internal fuel piping conduit.

18. The fuel dispenser of claim 15 further comprising a slanted collection plate located inside said fuel handling component area that is coupled to a side of said leak collection chamber and to an inside surface of said housing that collects leaked fluid and transports the fluid to said leak collection chamber by gravitational force.

19. The fuel dispenser of claim 18, wherein said internal fuel piping conduit passes through an orifice inside said slanted collection plate.

20. A fuel dispenser that dispenses fuel received from a main fuel piping conduit fluidly coupled to an underground storage tank, comprising:

a housing containing a fuel handling component area;

an internal fuel piping conduit that is fluidly coupled to the main fuel piping conduit to receive fuel;

a leak collection chamber having a bottom and sides with an open top that is located inside said fuel handling component area and that collects fluid leaked inside said housing;

a branch fuel piping conduit fluidly coupled to and between the main fuel piping conduit and said internal fuel piping conduit and that carries fuel to said internal fuel piping conduit, wherein said branch fuel piping conduit contains an inner piping and an outer piping that creates an annular space between said inner piping and said outer piping; and a shear valve having an annular space that is coupled to said annular space and that couples said branch fuel piping conduit to said internal fuel piping conduit.

21. The fuel dispenser of claim 20, wherein said internal fuel piping conduit contains an inner piping and outer piping that creates an annular space between said inner piping and said outer piping, and wherein said annular space of said internal fuel piping conduit, said shear valve and said branch fuel piping conduit are all fluidly coupled to each other.

22. The fuel dispenser of claim 21, further comprising a main fuel piping conduit that contains an inner piping and outer piping that creates an annular space between said inner piping and said outer piping, wherein said main fuel piping is coupled to said branch fuel piping conduit and carries fuel to said branch fuel piping conduit, and wherein said annular space of said branch fuel piping conduit is coupled to said annular space of said main fuel piping conduit.

23. The fuel dispenser of claim 20 further comprising an internal fuel piping conduit located inside said fuel handling component area that is fluidly coupled to the main fuel piping conduit wherein said leak collection chamber is located on a first side of said internal fuel piping conduit.

24. The fuel dispenser of claim 20 further comprising a slanted collection plate located inside said fuel handling component area that is coupled to a side of said leak collection chamber and to an inside surface of said housing that collects leaked fluid and transports the fluid to said leak collection chamber by gravitational force.

25. The fuel dispenser of claim 24, wherein said internal fuel piping conduit passes through an orifice inside said slanted collection plate.

26. A fuel dispenser that dispenses fuel received from a main fuel piping conduit fluidly coupled to an underground storage tank, comprising:

a housing containing a fuel handling component area;

an internal fuel piping conduit that is fluidly coupled to the main fuel piping conduit to receive fuel;

a leak collection chamber having a bottom and sides with an open top that is located inside said fuel handling component area and that collects fluid leaked inside said housing;

a control system and a fluid level sensor located inside said leak collection chamber wherein said fluid level sensor is coupled to said control system to register the fluid level inside said leak collection chamber;

said fluid level sensor sends a signal to a control system when the fluid level of said leak collection chamber exceeds a threshold fluid level, and wherein said control system generates an alarm when the fluid level of said leak collection chamber exceeds a threshold fluid level; and a slanted collection plate located inside said fuel handling component area that is coupled to a side of said leak collection chamber and to an inside surface of said housing that collects leaked fluid and transports the fluid to said leak collection chamber by gravitational force.

27. The fuel dispenser of claim 26 wherein said control system sends a signal to a controller when the fluid level of said leak collection chamber exceeds a threshold fluid level, and wherein said controller or said control system sends a signal to a submersible turbine pump located outside of the housing that pumps fuel from the underground storage tank to the main fuel piping conduit to shut down said submersible turbine pump in response to receipt of said signal from said control system.

28. The fuel dispenser of claim 26 wherein said controller is comprised from the group consisting of a site controller, a tank monitor, and a remote system.

29. The fuel dispenser of claim 26 further comprising an internal fuel piping conduit located inside said fuel handling component area that is fluidly coupled to the main fuel piping conduit wherein said leak collection chamber is located on a first side of said internal fuel piping conduit.

30. The fuel dispenser of claim 26, wherein said internal fuel piping conduit passes through an orifice inside said slanted collection plate.

31. The fuel dispenser of claim 26, wherein said control system is comprised from the group consisting of a site controller, a tank monitor, and a remote system.

32. The fuel dispenser of claim 27 further comprising an internal fuel piping conduit located inside said fuel handling component area that is fluidly coupled to the main fuel piping conduit wherein said leak collection chamber is located on a first side of said internal fuel piping conduit.

33. The fuel dispenser of claim 27 further comprising a slanted collection plate located inside said fuel handling component area that is coupled to a side of said leak collection chamber and to an inside surface of said housing that collects leaked fluid and transports the fluid to said leak collection chamber by gravitational force.

34. The fuel dispenser of claim 33, wherein said internal fuel piping conduit passes through an orifice inside said slanted collection plate.

35. The fuel dispenser of claim 27, wherein said controller is comprised from the group consisting of a site controller, a tank monitor, and a remote system.

36. A fuel dispenser that dispenses fuel received from a main fuel piping conduit fluidly coupled to an underground storage tank, comprising:

a housing containing a fuel handling component area;

an internal fuel piping conduit that is fluidly coupled to the main fuel piping conduit to receive fuel;

a leak collection chamber having a bottom and sides with an open top that is located inside said fuel handling component area and that collects fluid leaked inside said housing; and a control system and a fluid level sensor located inside said leak collection chamber wherein said fluid level sensor is coupled to said control system to register the fluid level inside said leak collection chamber;

wherein said control system determines the rate of increase of the fluid level in said leak collection chamber using said fluid level sensor.

37. The fuel dispenser of claim 36 wherein said control system sends a signal to a controller if said rate of increase in the fluid level of said leak collection chamber exceeds a threshold rate of increase.

38. The fuel dispenser of claim 36 wherein said control system generates an alarm if said rate of increase in the fluid level of said leak collection chamber exceeds a threshold rate of increase.

39. The fuel dispenser of claim 37 wherein said control system or controller sends a signal to a submersible turbine pump that pumps fuel from the underground storage tank to the main fuel piping conduit to shut down said submersible turbine pump in response to receipt of said signal.

40. The fuel dispenser of claim 36 further comprising an internal fuel piping conduit located inside said fuel handling component area that is fluidly coupled to the main fuel piping conduit wherein said leak collection chamber is located on a first side of said internal fuel piping conduit.

41. The fuel dispenser of claim 36 furhter comprising a slanted collection plate located inside said fuel handling component area that is coupled to a side of said leak collection chamber and to an inside surface of said housing that collects leaked fluid and transports the fluid to said leak collection chamber by gravitational force.

42. The fuel dispenser of claim 41, wherein said internal fuel piping conduit passes through an orifice inside said slanted collection plate.

43. The fuel dispenser of claim 36, wherein said control system sends a signal to a controller when the fluid level of said leak collection chamber exceeds a threshold fluid level.

44. The fuel dispenser of claim 43, wherein said control system generates an alarm when the fluid level of said leak collection chamber exceeds a threshold fluid level.

* * * * *